United States Patent [19]

Fujiwara

[11] Patent Number: 5,455,647
[45] Date of Patent: Oct. 3, 1995

[54] OPTICAL APPARATUS IN WHICH IMAGE DISTORTION IS REMOVED

[75] Inventor: Akihiro Fujiwara, Yokohama, Japan

[73] Assignee: Canon Kabushiki Kaisha, Tokyo, Japan

[21] Appl. No.: 220,466

[22] Filed: Mar. 31, 1994

Related U.S. Application Data

[63] Continuation of Ser. No. 792,677, Nov. 15, 1991, abandoned.

[30] Foreign Application Priority Data

Nov. 16, 1990 [JP] Japan .................................. 2-310750

[51] Int. Cl.$^6$ ................................................. G03B 21/53
[52] U.S. Cl. ........................... 353/101; 353/69; 352/140; 348/745
[58] Field of Search ................................ 353/101, 100, 353/70, 69, 79; 354/408, 403, 402, 400; 352/140; 356/4, 5, 12, 14, 13, 4.5, 8; 348/745, 806

[56] References Cited

U.S. PATENT DOCUMENTS

| | | | |
|---|---|---|---|
| 3,838,275 | 9/1974 | Stauffer | 352/140 |
| 3,856,392 | 12/1974 | Harrison | 353/101 |
| 4,191,460 | 3/1980 | Fujiki | 352/140 |
| 4,304,474 | 12/1981 | Stein | 354/408 |
| 4,371,261 | 2/1983 | Tsuji | 356/4 |
| 4,746,790 | 5/1988 | Sorimachi | 354/408 |
| 4,874,239 | 10/1989 | Tamura | 356/4 |
| 4,947,202 | 8/1990 | Kitajima et al. | 356/4 |
| 4,989,076 | 1/1991 | Owada et al. | 358/61 |
| 5,056,913 | 10/1991 | Tanaka et al. | 356/4 |
| 5,168,298 | 12/1992 | Hirai | 354/403 |

FOREIGN PATENT DOCUMENTS 60-256114 12/1985 Japan .

*Primary Examiner*—William A. Cuchlinski, Jr.
*Assistant Examiner*—William C. Dowling
*Attorney, Agent, or Firm*—Fitzpatrick, Cella, Harper & Scinto

[57] ABSTRACT

An optical apparatus including an optical assembly having an image formation optical system and a device for receiving an image, said optical assembly including optical components disposed along an optical axis for projecting the image to a display surface, a detecting device for detecting each distance to a plurality of predetermined locations which are set apart from each other and for producing detection signals representing a non-orthogonal relationship between the display surface and the optical axis, and a controlling device for biasing at least one of the components included in the optical assembly in response to the detection signals thus obtained. Then, a part of such an optical assembly is driven in a direction perpendicular to the optical axis, thus making it possible to implement an optical apparatus capable of obtaining a projected image which is in focus all over the screen without distortion.

10 Claims, 3 Drawing Sheets

OPTICAL APPARATUS IN WHICH IMAGE DISTORTION IS REMOVED

This application is a continuation of prior application Ser. No. 07/792,677, filed on Nov. 15, 1991, now abandoned.

BACKGROUND OF THE INVENTION

1. Field of the Invention

The present invention relates to an optical apparatus having an automatic focusing detection means. More particularly, the invention relates to an optical apparatus with an automatic focusing detection means suitably adaptable to a video, slide projector for movie films, overhead projector (OHP), photographic apparatus for blackboard descriptions, or the like, capable of projecting the projection image on a screen in an excellent condition by obtaining ranging information (distance information) in a plurality of areas on the aforesaid screen when a projecting image source such as a projection image or liquid crystal light bulb is projected on the screen by a projecting system.

2. Related Background Art

Traditionally, among those projectors which project the image of a projecting image source on a screen with a projecting optical system, there has been proposed a projector provided with an automatic focusing detection means (hereinafter referred to as AF means) thereby projecting an in focus image of a projecting image source on a screen.

FIG. 5 is a diagrammatical view showing the structure of the principal part of a projector having a conventional AF means. In FIG. 5, a reference numeral 201 designates a projector and 202, an AF means. The projector 201 in FIG. 5 projects the image on a projection image display 50 with a liquid crystal light bulb and others illuminated by a light beam from an illuminating light source 12 on a screen 1 via a projecting optical system 47.

At this juncture, the focusing adjustment, i.e., the AF operation, of a projecting system 203, whereby the image on the projection image display 50 should be focused on the screen 1 by the AF means 202, is performed as described below in accordance with a trigonometrical range finding method disclosed in Japanese Patent Laid-Open Application No. 60-256114, for example.

At first, by a controller 32, a floodlight driving signal 33 is inputted into a driving circuit 34. The driving circuit 34 generates a driving current 35 to apply to a floodlight element 36 like a LED. The floodlight element 36 emits infrared light. The infrared light 38 is projected on a screen 1 by a floodlight lens 37. The infrared light 38 projected onto the screen 1 is reflected. The reflected light 39 enters the light receiving element 41 comprising a two-piece sensor, position sensor and others through a light receiving lens 40. The light beam 39 at this juncture is converted into an electrical signal 42 corresponding to the incident position of the light receiving element 41. The electrical signal 42 is processed by a signal processing circuit 43 and is inputted into the controller 32 as a focus error signal 44.

The driving system 46 which comprises the driving circuit, driving actuator, and others drives a focus lens group 47 along the optical axis in response to a signal 45 from the controller 32, which indicates the appropriate adjustment (focusing) for the projecting system 203, thus performing the focusing adjustment.

On the other hand, when an image should be projected on a screen by a projector, the image is projected on the screen 1 provided that the optical axis 103a of the projecting optical system 103 is substantially perpendicular to the central region 1a of the screen 1 as shown in FIG. 3, and an image 81 of the oblong projecting image source, for example, becomes an oblong shape as shown in FIG. 3. In this case, the screen 1 is identical to the ideal projection plane.

Therefore, if the focusing condition in one portion of the projected image on the screen 1 is detected, it is possible to obtain a projected image on the entire area of the screen, the focusing of which has been performed as desired.

In contrast, if the center of the screen is located at a position higher than the projector, for example, the optical axis 103a of the projecting optical system enters on a slant at a large angle with respect to the central region 1a of the screen 1 as shown in FIG. 4. 10 Consequently, as shown in FIG. 4, the oblong projection image source 50 is distorted from the oblong shape to be a projected image of a trapezoid shape on the screen 1. Furthermore, the projected image 82 is out of focus but only in a portion thereof. Because of this, even if an AF means is provided for the projector, only a part of the projected image 82 on the screen 1 can be focussed by the use of the AF means, and there is a problem that the projected image of an excellent quality all over the screen cannot be obtained.

SUMMARY OF THE INVENTION

It is an object of the present invention to prevent a projected image from being distorted even if the screen and projector is not aligned when the image are projected onto the screen.

It is another object of the present invention to provide a camera capable of preventing a photographed image from being distorted when an objective plane is photographed.

It is still another object of the present invention to provide an apparatus capable of projecting a projection image source on the entire screen in an excellent focusing condition even when the center of the screen is biased with respect to the projection system in such a manner that a plurality of electronic ranging detection units are operated simultaneously or a single ranging detection unit is operated time-divisionally so as to obtain ranging signals (distance singals) in a plurality of areas on the screen which are the ranging objects, and these plural distance signals are processed arithmetically.

It is a further object of the present invention to adjust the focusing of the projecting optical system by obtaining ranging signals related at least to two areas, a first area and second area, having different distances of the ranging objects by electronic distance detecting means and at the same time, driving the member partially constituting the projection system along the direction of the optical axis and/or perpendicular to the direction of the optical axis on the basis of the two ranging signals from the aforesaid electronic distance detecting means.

In this respect, the member partially constituting the aforesaid projection system is particularly a focusing lens group or projection image source or light sensitive plane.

In addition, a projector adapting the present invention is provided with a projecting optical system for projecting a projection image source onto a predetermined plane, electronic distance detecting means for detecting distance information to at least two areas, a first area and second area, on the aforesaid predetermined plane, and driving means for driving a focus lens group of the aforesaid projecting optical system and/or the aforesaid projection image source along the optical axis direction and/or perpendicular to the optical axis direction on the basis of the signals from the aforesaid detecting means for the focusing adjustment.

DETAILED DESCRIPTION OF THE PREFERRED EMBODIMENTS

Figure 1:
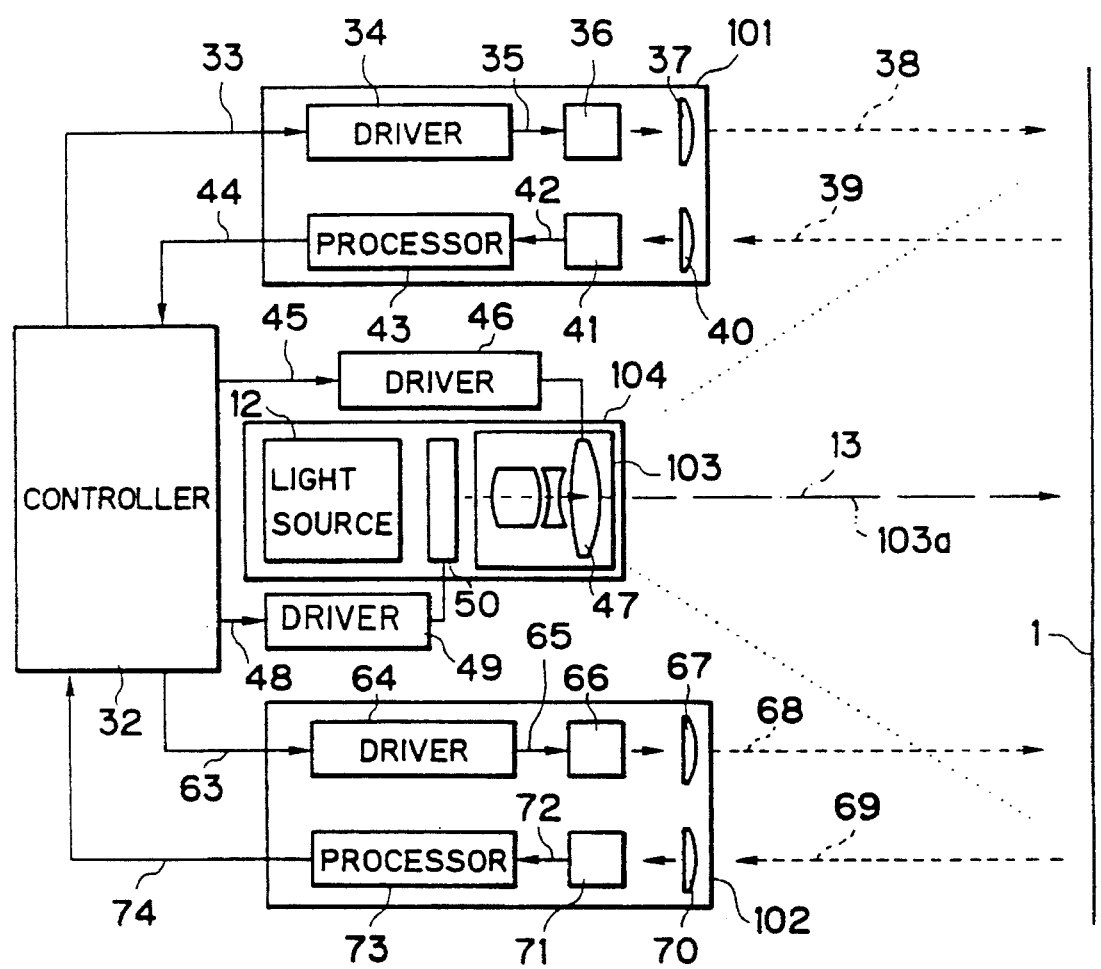
FIG. 1 is an optical arrangement illustrating an embodiment according to the present invention.

FIG. 1 is a diagrammatical view of a principal part of an embodiment adapting the present invention to a projector. In FIG. 1, a reference numeral 104 designates a projector, and 12, a light source for the projector comprising a halogen lamp or mercury lamp and others to illuminate by the light beam from the aforesaid light source 12 the projection image display 50 produced by liquid crystal light bulb. The liquid crystal light bulb displays an image by video signals. Also, the projection image display 50 is structured to be driven by a driving system 49 in the direction of the optical axis 103a of the projecting optical system 103 and in the direction perpendicular to the optical axis 103a. The display 50 may be produced by the combination of an R.B.G. display and a dichroic mirror group in some cases as disclosed in U.S. patent appln. Ser. No. 147519 of the present assignee hereof, for example.

Figure 2:
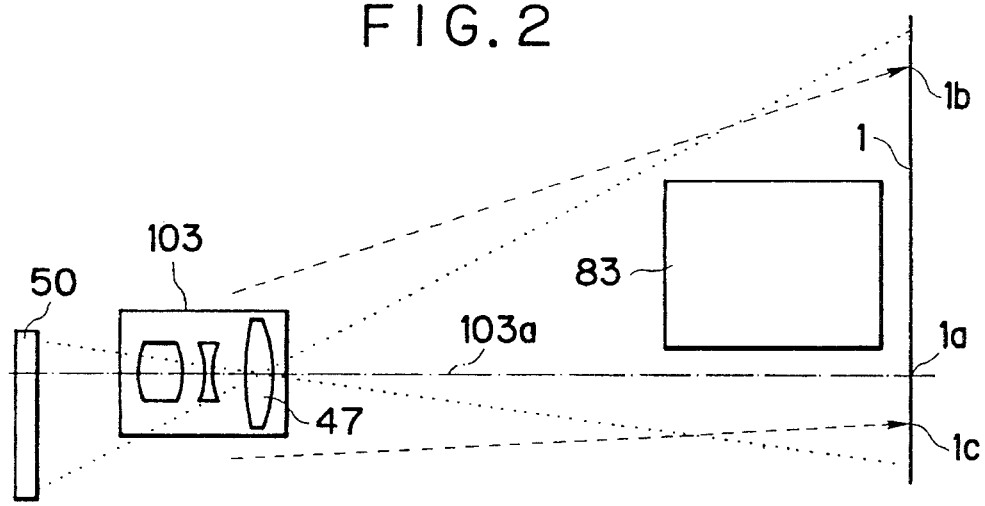
FIG. 2 is a diagrammatical view illustrating the optical function of the embodiment.
Figure 3:
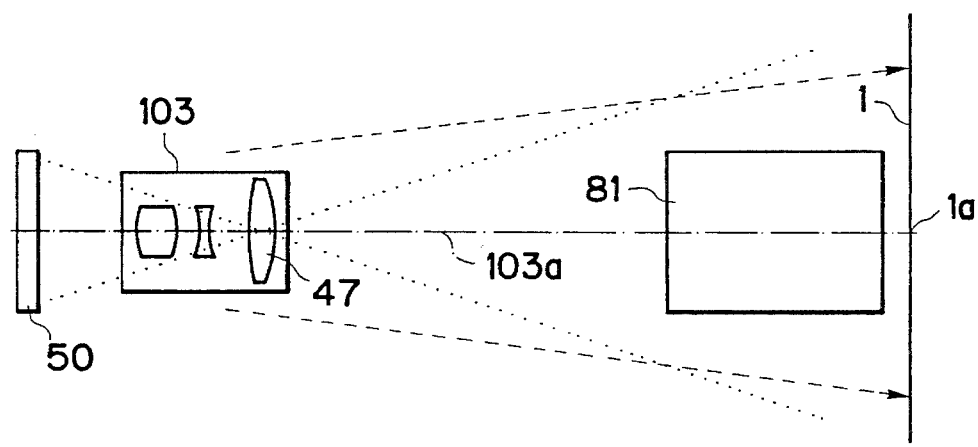
FIG. 3 is a diagrammatical view illustrating the optical function when a projector is equipped in the most desirable state with respect to its screen.
Figure 4:
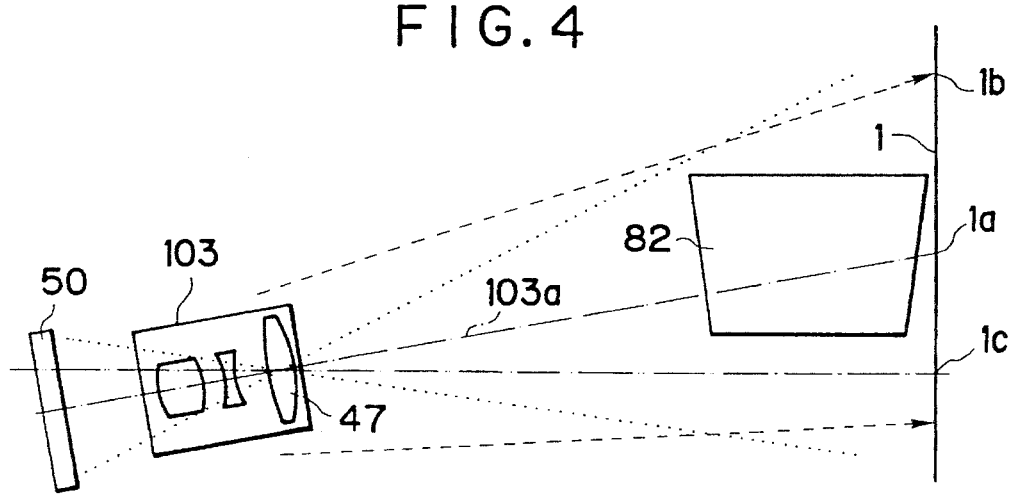
FIG. 4 is a diagrammatical view illustrating the optical function when a projector is equipped in the usual state.
Figure 5:
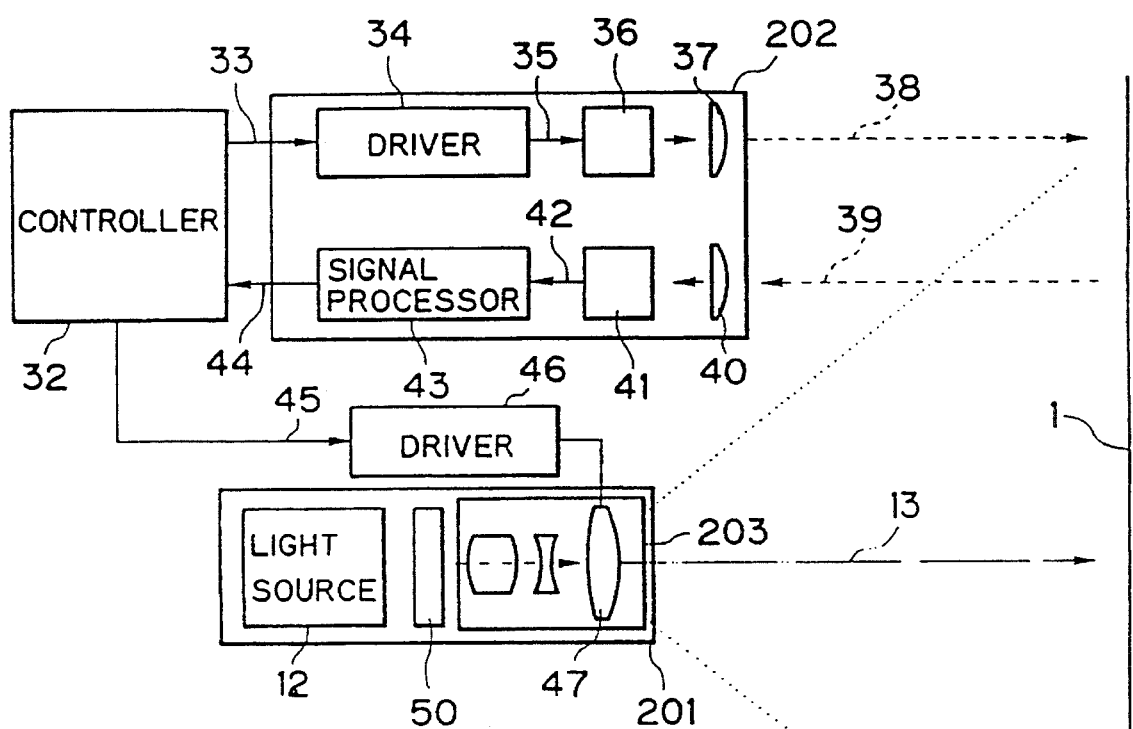
FIG. 5 is an optical arrangement illustrating a modification of a prior art projector.

A reference numeral 103 designates the projecting optical system to project the image on the projection image display 50 onto the screen 1, and 47, the focusing lens group of the projecting optical system 103, which is structured to be driven by a driving system 46 in the optical axis direction 103a and in the direction perpendicular to the optical axis 103a. The projecting optical system 103 and the projection image display 50 constitute respectively the elements of a projecting system 104. Reference numerals 101 and 102 designate respectively electronic distance detecting units thereby to obtain ranging signals for the different areas, first and second, on the screen 1 by the use of two distance detecting units each having a same function in the present embodiment. The first areas and second area are established each at a different distance from the projecting optical system 103 respectively, and further as shown in FIG. 2, these areas are established so as to correspond to the two areas 1b and 1c in the vertical direction when the center of the screen 1 is located above the projecting optical system 103. In this respect, it is preferable to make the center of the screen identical to the center of a circle so that ranging points are set at positions obtainable by dividing the circumference thereof into three. Then, it becomes possible to cope with the situation even when the screen is inclined in the horizontal direction.

A reference numeral 32 designates a controller (microcomputer) to control the two distance detecting units 101 and 102 as well as to control the driving of the two driving systems 46 and 49 by obtaining the ranging signals with respect to the two areas. In other words, the floodlight driving signal 33 (63) from the controller 32 is inputted into the driving circuit 34 (64). The driving circuit 34 (64) generates driving current 35 (65) in response to the floodlight driving signal 33 (63) to input it into the floodlight element 36 (66). The floodlight element 36 (66) generates infrared light in accordance with the driving current 35 (65). The aforesaid infrared light 38 (68) is floodlit through a floodlight lens 37 (67) to become a light spot on the screen 1.

The light spot floodlit on the screen 1 is reflected as reflected light 39 (69) which enters the light receiving element 41 (71), consisting of a position sensor and others, through a light receiving lens 40 (70).

The light receiving element 41 (71) generates an electric signal 42 (72) depending on the incident position of the light beam. The signal processing circuit 43 (73) calculates the ranging signal (distance signal) 44 (74) using the aforesaid electric signal 42 (72) and outputs the ranging signal 44 (74) thus obtained by calculation to the controller 32.

The driving system 46 comprises a driving circuit and a driving actuator to control the driving of the focusing lens group 47 in response to the signals 45 output from the controller 32 with respect to the focusing adjustment of the focusing lens group 47. Here, it may be possible to perform the adjustment by driving the entire body of the projecting optical system 103 instead of the focusing lens group.

The driving system 49 comprises a driving circuit and a driving actuator the same as the driving system 46 to drive the projection image display 50 in the direction intersecting the optical axis 103a in response to the signals 48 output from the controller 32 with respect to the driving of the projection image display 50.

In the present embodiment, while a trigonometrical survey method using infrared light such as disclosed in Japanese Patent Laid-Open Application No. 60-256114 is adopted as a ranging method for the distance detecting device, the method is not necessarily limited thereto.

For the light receiving elements 41 and 71, position detecting elements (position sensors, SPDs) are used, thus converging the reflected lights 39 (69) by the light receiving lenses 40 (70) on the planes of the light receiving elements 41 (71) for the image formation. Then, the ranging information 44 (74) is obtained on the basis of the positional information regarding the image formation of the spot image by utilizing the specific relationship which exists between the position of the image formation of the spot image projected by the reflection light 39 (69) on the light receiving plane and the distance from the projecting optical system 103 to the screen 1.

The controller 32 calculates the distance to an object along the optical axis 103a and the degree of the screen inclination in accordance with the values of the two ranging signals 44 and 74 at that time and drives the focusing lens group 47 of the projecting optical system 103 as well as controls the driving of the projection image display 50 in the optical axis direction 103a and the direction perpendicular thereto in accordance with the degree of its inclination.

Then, as shown in FIG. 2, for example, the projecting optical system 103 and projection image display 50 are adjusted. In FIG. 2, the projection image display 50 has been driven greatly in the direction of the optical axis 103a and in the direction perpendicular thereto. Therefore, the projecting optical system 103 can be horizontally positioned as it is. By these adjustments, when the entire body of the oblong projection image display 50 is projected on the screen 1, for example, the projected image 83 becomes oblong as shown in FIG. 2. Further, it is possible to obtain the projected image 83 which is in focus all over its image.

Also, it may be possible to eliminate the distortion of a projected image by driving or inclining the focusing lens group 47 or the projecting optical system 103 as a whole in the direction of the optical axis and the direction perpendicular thereto instead of driving the projection image display when the focusing adjustment is performed. Here, it may also be possible to use a filmed image as a projection image display 50 besides the liquid crystal light bulb. The present invention is also applicable as described earlier to a usual camera or the like adopted as an optical system instead of the projector. In such a case, an object is regarded as the screen and the light sensitive plane (silver bromide film, CCD photographic element, or the like), as a projection image display 50 in handling each of them for the purpose.

When the present invention is applied to a projector, for example, the ranging information can be obtained in a plurality of areas in the screen by the electronic distance detecting means even if the optical axis of the projecting system is not arranged to face the screen vertically and match its center with the center of the screen, and using the aforesaid ranging information, a part of the projecting optical system and/or the projection image source is driven in the direction perpendicular to the optical axis for adjustment. Hence, according to the present invention, it is possible to implement an optical apparatus capable of obtaining a projected image which is in focus all over the screen without distortion.

What is claimed is:

1. An optical apparatus, comprising:

an optical assembly having an image formation optical system and means for providing an image, said optical assembly including optical components disposed along an optical axis for projecting the image to a display surface;

detecting means for detecting a distance to each of a plurality of locations which are set apart from each other on the display surface, and for producing, from the detected distances, detection signals representing a non-orthogonal relationship between the display surface and the optical axis; and controlling means for biasing at least one of said optical components included in said optical assembly in response to said detection signals.

2. An optical apparatus according to claim 1, wherein said at least one optical component to be biased comprises said means for receiving said image.

3. An optical apparatus according to claim 1, wherein said image formation optical system comprises a movable portion, and wherein said at least one optical component to be biased comprises said movable portion of said image formation optical system.

4. An optical apparatus according to claim 1, wherein said image formation optical system comprises a movable portion, and wherein said at least one optical components to be biased comprise said means for providing said image and said movable portion of said image formation optical system.

5. An optical apparatus according to claim 1, wherein said image formation optical system comprises a movable portion, and wherein said controlling means performs focusing adjustment by driving said movable portion of said image formation optical system.

6. An optical apparatus according to claim 1, wherein said controlling means shifts at least one of said optical components included in said optical assembly in response to said detection signals.

7. A projecting apparatus for projecting an image onto a projection plane, comprising:

a projecting optical system having a portion movable along an optical axis for performing focusing adjustment;

image providing means for providing an image;

electronic detection means for detecting an inclination degree of said projection plane, for detecting the amount of focusing adjustment to be performed by said projecting optical system, and for producing an output in accordance therewith; and means for adjusting said movable portion in response to the output of said detection means, and for driving one of said image providing means and said projecting optical system in the direction intersecting said optical axis.

8. A projecting apparatus according to claim 7, wherein the portion of the projecting optical system which is driven in the direction intersecting said optical axis is a movable portion to be driven for effecting focusing adjustment.

9. A projecting apparatus according to claim 7, wherein said image providing means has liquid crystal light bulbs.

10. A projecting apparatus according to claim 7, wherein said electronic detection means has a plurality of detecting units for detecting distances to specific locations on said projection plane, respectively.

* * * * *

UNITED STATES PATENT AND TRADEMARK OFFICE
CERTIFICATE OF CORRECTION

PATENT NO. : 5,455,647
DATED : October 3, 1995
INVENTOR(S) : Akirhiro Fujiwara

It is certified that error appears in the above-indentified patent and that said Letters Patent is hereby corrected as shown below:

COLUMN 1:

Line 16, "the projection" should read --a projection--.

COLUMN 2:

Line 15, "10 Consequently," should read -- Consequently,--;
Line 30, "is" should read --are-- and "are" should read --is--.

COLUMN 3:

Line 36, "Ser. No. 147519" should read --Ser. No. 147,519--.

COLUMN 6:

Line 8, "components" should read --component--;
Line 9, "comprise" should read --comprises--.

Signed and Sealed this

Twelfth Day of March, 1996

Attest:

BRUCE LEHMAN

*Attesting Officer*      Commissioner of Patents and Trademarks